(12) United States Patent
Redekop

(10) Patent No.: US 6,336,547 B1
(45) Date of Patent: Jan. 8, 2002

(54) HIGH SPEED LOG LADDER

(76) Inventor: Stanley W. Redekop, 9650 Bottom Wood Lake Road, Winfield British Columbia (CA), V4V 1S7

( * ) Notice: Subject to any disclaimer, the term of this patent is extended or adjusted under 35 U.S.C. 154(b) by 0 days.

(21) Appl. No.: 09/555,312

(22) PCT Filed: Nov. 28, 1997

(86) PCT No.: PCT/CA97/00921

§ 371 Date: May 30, 2000

§ 102(e) Date: May 30, 2000

(87) PCT Pub. No.: WO99/28217

PCT Pub. Date: Jun. 10, 1999

(51) Int. Cl.[7] ............................................... B65G 43/00
(52) U.S. Cl. ................. 198/444; 198/463.5; 198/459.5; 198/777
(58) Field of Search ................................ 198/444, 456, 198/464.2, 463.5, 459.5, 773, 777; 414/745.9, 746.2, 746.4

(56) References Cited

U.S. PATENT DOCUMENTS

| | | |
|---|---|---|
| 3,029,922 A | 4/1962 | Rau |
| 3,330,401 A | 7/1967 | Ahlstedt |
| 4,624,361 A | 11/1986 | Hollins |
| 4,911,283 A | 3/1990 | Hollins |
| 5,119,930 A | 6/1992 | Stelter |
| 5,423,417 A | 6/1995 | Redekop |

FOREIGN PATENT DOCUMENTS

| | | |
|---|---|---|
| CA | 1277682 | 12/1990 |
| CA | 2077777 | 10/1994 |
| CA | 2089780 | 8/1996 |
| DE | 1134931 | 8/1962 |
| DE | 2324740 | 11/1973 |
| GB | 1256509 | 12/1971 |

*Primary Examiner*—Joseph E. Valenza
(74) *Attorney, Agent, or Firm*—Antony C. Edwards

(57) ABSTRACT

An ending apparatus for a log ladder (2), wherein the log ladder (2) sorts, feeds and sequentially indexes logs (54) along a longitudinal array of laterally extending adjacent log cradles (4, 8, 12), having, in the log cradles (4, 8, 12), exclusive of a downstream—most log cradle (12) in the longitudinal array, log translating means (64) for laterally translating the logs (54), when the logs (54) are in the log cradles (4, 8) exclusive of the downstream—most log cradle (12), so as to abut one end of the logs (54) against an edge (72) of the log ladder (2), wherein the log translating means (64) has selectively actuable rollers (64) mounted within a lower vertice of the log cradles (4, 8), wherein the selectively actuable rollers (64) are mounted in lateral array and the rollers (64) are generally hourglass-shaped so that in longitudinal cross section the rollers (64) have a longitudinal profile generally matching the longitudinal profile of a longitudinal cross section of the log cradles (4, 8), and wherein the log translating means (6, 10) further has first sensing means cooperating with the selectively actuable rollers (64) for sensing the presence of the logs (54) in the log cradles (4, 8) and triggering selective rotation of the selectively actuable rollers (64) whereby said logs (54) are ended against the edge (72) of the log ladders (2), and wherein the log ladder further has second sensing means (62), cooperating with lifting and culling means (6, 10, 14) corresponding to the log cradles (4, 8, 12), for delayed triggering of the lifting and culling means when the logs (54) are held in the log cradles so as to increase dwell time of the logs on the log translating means (64).

5 Claims, 7 Drawing Sheets

HIGH SPEED LOG LADDER

FIELD OF THE INVENTION

This invention pertains to the field of devices for sorting and indexing cylindrical objects and in particular relates to ending apparatus to assist high speed sorting of a pile of logs and indexing those logs into a sequential end-to-end stream of logs.

BACKGROUND OF THE INVENTION

In the log processing environment, there is often a requirement to sort a pile of logs and index those logs so that they can be fed on to a conveyor belt or the like to form a continuous end-to-end chain of logs.

Numerous devices have been tried in the prior art to unscramble or sort, index and feed logs or like elongated objects from a stack of such objects. In the log processing environment generally a stack of logs is placed in contact with an unscrambling or sorting mechanism. The unscrambling or sorting mechanism attempts to disentangle and cull logs from the stack of logs and transport them away from the stack or pile of logs. A feeding and indexing mechanism attempts to transfer the logs one at a time from the unscrambling or sorting mechanism to form a continuous stream of logs moving downstream away from the stack of logs on some conveyancing means such as a conveyor belt.

As I describe in my U.S. Pat. No. 5,423,417, which issued Jun. 13, 1995, for a Log Ladder, one type of unscrambling or sorting mechanism is taught by Stelter in U.S. Pat. No. 5,119,930 which issued on Jun. 9, 1992 for a device entitled Quadrant Log Feeder. A movable quadrant having a curved peripheral surface is rotated over a fixed quadrant to raise at least one log from the logs' holding location and to deposit the logs against a conventional type of notched-disc singulator. The notched-disk singulator acts to index the logs one-at-a-time onto a conveyor belt.

Another type of unscrambling or sorting mechanism is a so called "step sorter" which forms part of the combined sorter/indexer mechanism disclosed in Canadian Patent No. 1,277,682 which issued to Interlog AB Sweden for a "Device for Piece Meal Transversal Feed of Longish Objects, Preferably Wood Pieces" and was modified by Lindenblatt in Canadian Patent No. 2,077,777 which issued Oct. 18, 1994 for an Ending Apparatus and Method. A further unscrambling or sorting mechanism forms part of the combined sorter/indexer mechanism disclosed in United Kingdom Patent No. 1,256,509 which issued to Wellman-Cranes Limited for "Improved Means for Unscrambling Elongated Articles". Both of the above unscrambling and sorting devices rely on oscillating or translating one set of steps relative to a second set of steps so as to transfer any logs held in one particular step up to the next higher step. In step sorters, if the first stage of the step sorter, that is, the stage which is in contact with a pile of logs, does not on any one cycle pick up a log, then a blank is introduced into the stream of logs moving up the stepped ladder. Because each set of steps moves as a single unit, there is no way to re-engage the first stage of the step sorter with the pile of logs so as to place a log into the blank in the stream of logs. The Lindenblatt device teaches placing hourglass-shaped ending rolls in the upper stationary pocket of the Interlog AB singulating device, so that logs in the uppermost pocket are ended against a reference surface.

One type of feeding and indexing machine is illustrated in U.S. Pat. No. 4,911,283 which issued to Hollins on Mar. 27, 1990. An earlier version of this machine is the subject of U.S. Pat. No. 4,624,361 which issued to Hollins on Nov. 25, 1986. U.S. Pat. No. 3,330,401 which issued to Ahlstedt on Jul. 11, 1967 also illustrates a feeding and indexing machine operating on somewhat similar principles to the Hollins device.

The Hollins and Ahlstedt devices feed and index logs which have been sorted from a pile of logs and delivered to their indexing mechanisms as a transversely oriented stream of logs. Both Hollins and Ahlstedt rely on an arm, or transverse array of arms, pivoting about an upstream pivot so as to bring a contact face on the arm or arms against the downstream-most log waiting to be indexed from the feeder queue. The arm or arms pivot in a direction opposite to the direction of movement of the stream of logs. That is, while the stream of transversely oriented logs are moving down the feed queue in, for example a counter-clockwise direction as viewed from the side of the device, the arm or arms pivot in a clockwise direction.

Hollins indicates that log feeders utilizing the principles set out in his two patents are limited in the range of log sizes that can be accommodated by any one particular log feeder. It has been found that because logs are not of uniform diameter and are often warped and twisted, that log feeders employing the Hollins principle do not consistently feed logs on every cycle of the lift arms. That is, employing lift arms pivoting about an upstream pivot point so as to force the feeder queue to move back upstream, thereby allowing the lifting portion of the lifting arm located downstream of the feeder queue to cull one log (the downstream-most log) from the feeder queue and raise it so that the log can roll clear of the log feeder, does not consistently operate to cull a single log from the feeder queue.

In a log mill environment, it is important to be able to reliably feed one log after another onto a conveyancing means such as a conveyor belt because empty spaces left on the conveyor belt mean that the mill processor waiting at the downstream end of the conveyor belt is not being fully utilized. Conveyor belts convey the logs resting on them at a uniform speed. Empty spaces on the conveyor belt caused by an inconsistently operating log feeder mean that the downstream mill processor is not working at full or design capacity.

As described in my U.S. Pat. No. 5,423,417, a first set of independently actuable lift arms which pivot about a first axis which is located generally beneath a first notched step, and downstream in relation to the point of engagement where the lift arm engages the downstream-most log in the stack of logs; cooperating with a second set of independently actuable lift arms which pivot about a second axis located downstream from the first axis, and generally beneath a second notched step, is an improvement over existing unscrambler/sorter devices or existing feeder/indexer devices, or existing combined sorter/indexer devices. In my U.S. Pat. No. 5,423,417, the use of more than one set of lift arms cooperating with corresponding steps notched in a log ladder was described as not only unscrambling and sorting logs from a pile of logs but also feeding and indexing the logs without the need for conventional sorters, as in Hollins, or conventional singulators, as in Stelter. Further, I described that the use of my invention to sort, feed and index stacks of twisted, warped or bent logs resulted in a higher consistency in indexing and feeding logs one at a time on to a conveyancing means such as a conveyor belt than could be achieved by prior art combined sorter/indexers.

It was found that using only a single stage of the invention, that is, only one set of downstream pivoted lifting arms operating from beneath a single notched step as a means for sorting logs from a stack of logs and feeding them in an indexed fashion onto an adjacent conveyancing means such as a conveyor belt had an improved reliability over Hollins type devices used in conjunction with conventional sorters, or over Stelter-type devices used in conjunction with conventional singulators. That is, using a single stage of the invention resulted in a greater percentage of the time that a single cycle of engaging the first stage lift arms with a stack of logs resulted in a single log being removed from the stack of logs and deposited from the lift arms. Thus using only a single stage log feeder incorporating the invention resulted in the conveyancing means such as a conveyor belt being loaded to a greater percentage of full capacity so that the downstream mill processor was being utilized at that greater percentage of its capacity.

The consistency with which logs were indexed into a stream of end-to-end logs on the conveyor belt when leaving my log ladder invention was increased by adding a second stage, or a multiple array of parallel stages of independently actuable sets of downstream pivoted lift arms. In this arrangement each set of lift arms operated on logs supplied from the adjacent upstream set of lift arms.

Using, for example, a three stage log ladder incorporating the invention, the log ladder was formed of three adjacent and transversely oriented log cradles which could take the form of notched steps. In particular, my log ladder could be a frame comprised of notched longitudinal members supported by lateral cross-members, where the notching in the longitudinal members defined the shape of the notched steps.

In my log ladder invention, the spaces between the longitudinal members laterally were covered-in with surface plates called skid plates. The skid plates formed generally V-shaped log cradles between the longitudinal members. The skid plates formed a skid surface so that logs could be pushed over the skid plates by the action of the lift arms. The skid plates helped prevent branches and like protrusions from the logs from getting snagged on the log ladder frame cross members as sometimes occurs with non-covered devices such as the Hollins device. Debris which fell from the logs was allowed to fall from the log ladder through lateral gaps between the skid plates formed along the base of the V-shaped log cradles. The lift arms, being plate-like and generally vertically and longitudinally oriented, acted to lift logs without also lifting the associated debris. Thus, unlike the Stelter device, debris was not transported along with the logs.

A downstream-pivoted set of lift arms was disposed beneath each notched step log cradle. Each set of lift arms was independently actuable (for example hydraulically) so that each set of lift arms could be independently raised from a lowered position beneath the notched step to a raised position whereby lifting faces on the lift arms engaged a single log from the corresponding notched step and deposited that log into the next adjacent downstream notched step.

In this arrangement, the first stage of the log ladder (that is, the upstream notched step) would typically hold a stack or pile of generally transversely oriented logs. The associated first set of lift arms would then lift a single log from the stack of logs in the first stage notched step and deposit that log into the second stage notched step immediately adjacent downstream of the first stage. The second stage set of lift arms would then transfer that log downstream and deposit it into the third stage notched step. The third stage set of lift arms would then raise that log out of the third stage notched step and deposit it on to a conveyancing means such as a conveyor belt.

The second and third stage notched steps advantageously were fitted with associated sensors to detect when a log had been deposited from the adjacent upstream stage so as to trigger the operation of the associated set of lift arms. If after the first stage set of lift arms had been cycled and no log had been deposited in the second stage then the sensors associated with the second stage triggered a recycling of the first stage set of lift arms until a log was deposited into the second stage.

The process of culling a single log from a plurality of logs held in a notched step is called singulating or indexing the logs. This was accomplished by raising the pivoting lift arms from beneath the notched step. A lifting face on each of the lift arms engaged the downstream-most logs and pushed them downstream over the downstream skid plates associated with that notched step. Forcing the logs over the skid plates caused the logs to rotate. In the case of two logs being forced over the skid plates, it was found that the two logs rotated in opposite directions to one another such that the log resting directly against the lifting faces rotated in a direction which urges it upwards between the lifting faces and the downstream log. This often caused the upstream log to "pop-up" over the tops of the lifting faces, wherefrom it rolled back into the upstream notched step. Thus a single log was left engaged with the lifting faces and singulating or indexing the logs had successfully been accomplished.

In the event that the first stage lift arms deposited a plurality of logs into the second stage, the second stage set of lift arms culled in a similar fashion, a single log from the plurality of logs deposited into the second stage and deposited that single log into the third stage to await feeding by the third stage set of lift arms in an indexed fashion on to the conveyancing means.

A sensor placed adjacent the conveyor belt detected when the log last loaded onto the conveyor belt from the third stage of the log ladder has been conveyed along the conveyor belt so as to just clear the log ladder. This sensor then triggered the next cycle of the third stage set of lift arms which lifted the log in the third stage so as to deposit it in close succession to the previous log on the conveyor belt.

Thus the consistency with which logs were deposited onto the conveyancing means was improved above that accomplished by a single stage of lift arms. Consequently, using a multistage log ladder, the downstream mill processor could be used at closer to design capacity rather than under-utilized because of empty spaces on the conveyor belt caused by an inconsistent log sorter, or an inconsistent log feeder/indexer.

A further improvement in the continuous and full utilization of the space available on the conveyor belt, was to incorporate hourglass rollers or like lateral log transfer devices into one or more stages of a multiple stage notched step log ladder so that after a log was deposited into that stage it was translated laterally within that stage so as to abut one edge of the log ladder. The edge of the log ladder against which the log was abutted corresponded to the side of the log ladder which was most downstream in the direction of movement of the conveyor belt. It was thought advantageous that the hourglass rollers were incorporated into the downstream-most, ie. uppermost, stage such as also taught in the Lindenblatt Ending Apparatus and Method.

What was not realized, and that which is not taught nor suggested in the prior art, is that for high speed feeding of logs from the log ladder, for example, at feed rates at greater than 20 pieces per minute, placing ending rolls in the last stage, or into one or more stages without programming the PLC controlling actuation of the lift arms on each of those stages to increase log dwell time on the ending rolls, resulted in logs not being properly ended against the ending reference surface. This introduced gaps in the feed of logs along the conveyor removing logs from the last stage of the log ladder.

Consequently, it is an object of the present invention to provide a high speed log ladder of the type described in my U.S. Pat. No. 5,423,417 for feed rates up to 40 or more pieces per minute, which incorporates ending rolls in a plurality of stages, exclusive of the last downstream stage of the log ladder, where the lifting of the lifting arms in the stages having ending rolls is delayed by the associated PLC to provide a dwell time for a log on the ending rolls before the log is lifted by the associated lifting arm to hold the log near the top of the notch for that stage awaiting clearance of the next downstream stage. This optimally results in the log being ended prior to lifting of the log into the last downstream stage so that a log in the last downstream stage may be immediately lifted for deposit onto the log conveyor when the previous log clears the edge of the log ladder.

Advantageously, the ending rolls in the plurality of stages exclusive of the last downstream stage are not necessarily symmetrically hourglass-shaped, but are asymmetrically hourglass-shaped to conform to the side profile of the notch associated with that stage. This may be accomplished by custom construction of solid surface ending rolls or, in one aspect of the present invention, by assembling the ending rolls as an array of adjacent differently sized plates, cogs or gears journalled onto a common axle or shaft.

SUMMARY OF THE INVENTION

An ending apparatus for a log ladder, where the log ladder sorts feeds and sequentially indexes in a downstream direction a stack of logs, including at an upstream end of the log ladder an upstream receiving means, oriented transversely to the log ladder, for receiving and holding in generally transverse orientation a plurality of logs, along the log ladder, downstream of the upstream end of the log ladder, a spaced and alternating array of (i) lifting and culling means, and (ii) log cradles, each of the log cradles and each of the lifting and culling means in the spaced and alternating array of lifting and culling means and log cradles being oriented transversely to the log ladder, and each of the log cradles being adapted to receive and hold logs in a generally transverse orientation to the log ladder, wherein, at an upstream end of the spaced and alternating array of lifting and culling means and log cradles, a lifting and culling means adjacent to the upstream receiving means for culling one or more logs from the logs in the upstream receiving means and for lifting the logs from the upstream receiving means and depositing the logs into a first log cradle in the spaced and alternating array, the first lifting and culling means cooperating between the upstream receiving means and the first log cradle in the spaced and alternating array, each of the remaining lifting and culling means in the spaced and alternating array cooperating between adjacent log cradles in the spaced and alternating array so as to cull a single log from the first log cradle and thereafter to lift and deposit the single log from an upstream adjacent log cradle to the next adjacent downstream log cradle whereby the single log is passed downstream along the spaced and alternating array, wherein each of the lifting and culling means comprise a lateral array of collectively pivotable arms, each of the collectively pivotable arms having a lifting face, the lateral array of collectively pivotable arms thus comprising a lateral array of lifting faces, the lifting faces for engaging and lifting the single log in a downstream direction along the aid spaced and alternating array, wherein each of the lateral array of arms are collectively pivotable between a lower upstream position below the upstream adjacent log cradle, and a raised downstream position, above and downstream of the lower upstream position, whereby the lateral array of lifting faces is above the next adjacent downstream log cradle, wherein the lateral array of collectively pivotable arms are collectively pivotable about pivots beneath and generally between the log cradles, and wherein each of the lifting and culling means in the spaced and alternating array are independently actuable and wherein the log cradles comprise opposed upstream and downstream skid faces in a generally "V"-shape in longitudinal cross section, the upstream and downstream skid faces including fixed rigid protrusion-free sheeting extending along the log cradles, the upstream and downstream skid faces defining therebetween a transverse elongate aperture extending along the log cradles, wherein a plurality of the said lot cradles exclusive of the downstreammost log cradle in the spaced and alternating array included log translating means for transversely translating logs, when the logs are in the plurality of log cradles, so as to abut one end of the logs against an edge of the log ladder wherein the log translating means includes actuable rollers mounted within the log cradle, wherein the rollers are mounted in lateral array between the upstream and downstream skid faces, and the rollers are generally hourglass-shaped so that in longitudinal cross-section the rollers have a longitudinal profile generally matching the longitudinal profile of a longitudinal cross-section of the upstream and downstream skid faces, wherein the log translating means further includes first sensing means sensors cooperating with the actuable rollers for sensing the presence of the log in the plurality of log cradles and triggering the rotation of the actuable rollers when the log is in the plurality of log cradles so as to translate the log over the rollers whereby the log is ended against the edge of the log ladders, wherein the log ladder further includes second sensing means, cooperating with the lifting and culling means corresponding to the plurality of log cradles, for delayed triggering of translation of the collectively pivotable arms from the lowered upstream position to the raised downstream position, when the logs are held in the plurality of log cradles whereby dwell time of the logs on the log translating means is increased.

An ending apparatus for a log ladder, where the log ladder sorts, feeds and indexes in a downstream direction a stack of logs into a stream of logs, including a first notched step and a first set of collectively selectively actuable lift arms pivotable about a first axis, and a second set of collectively actuable lift arms, selectively actuable independently of the first set of collectively actuable lift arms, downstream of said first set of lift arms, and pivotable about a second axis, the first set of lift arms selectively actuable between a lowered position and a raised position whereby the first set of lift arms are engageable with a log at a first engagement point, in the stack of logs wherefrom the log may be raised to the raised position, the first axis downstream of the first engagement point relative to the direction of movement of the logs in the stream of logs, the first axis generally below the first notched step the first notched step, adapted to receive and hold the stack of logs, the first set of lift arms in the raised position positioning the log so as to deposit the log into a second notched step below the first set of lift arms in the raised position and downstream of the first notched step, the second set of lift arms selectively actuable between a lowered position and a raised position whereby the second set of lift arms are engageable with the log in the second notched step at a second engagement point wherefrom the log may be raised from the second notched step, the second axis downstream of the second engagement point and generally below the second notched step, the second set of lift arms in the raised position positioning the log so as to deposit the log into a third notched step below the second set of lift arms in the raised position and downstream of the second notched step, a third set of lift arms, pivotable about a third axis, selectively actuable between a lowered position and a raised position whereby the third set of lift arms are engageable with the log in the third notched step at a third engagement point wherefrom the log may be raised from the third notched step, the third axis downstream of the third engagement point and generally below the third notched step, the third set of lift arms in the raised position positioning the log so as to deposit the log into a fourth notched step below the third set of lift arms in the raised position and downstream of the third notched step, a fourth set of lift arms, pivotable about a fourth axis selectively actuable between a lowered position and a raised position whereby the fourth set of lift arms are engageable with the log in the fourth notched step at a fourth engagement point wherefrom the log may be raised from the fourth notched step, the fourth axis downstream of the fourth engagement point and generally below the fourth notched step, the fourth set of lift arms in the raised position positioning the log so as to deposit the log into an adjacent downstream log receiving means, the first, second, third and fourth notched steps further comprising opposed upstream and downstream skid faces in a generally "V"-shape in longitudinal cross section, the upstream and downstream skid faces including fixed rigid protrusion-free sheeting extending along the first, second, third and fourth notched steps transversely across the log ladder, the upstream and downstream skid faces defining therebetween a transverse elongate aperture in each of the first, second, third and fourth notched steps, the first, second and third notched steps including log translating means for transversely translating logs, when logs are in the first, second and third notched steps, so as to abut one end of the logs against an edge of the log ladder, wherein the rollers are mounted in lateral array between the upstream and downstream skid faces, and the rollers are generally hourglass-shaped so that in longitudinal cross-section the rollers have a longitudinal profile generally matching the longitudinal profile of a longitudinal cross-section of the upstream and downstream skid faces, wherein the log translating means further includes first sensing means sensors cooperating with the actuable rollers for sensing the presence of the log in the plurality of log cradles and triggering the rotation of the actuable rollers when the log is in the plurality of log cradles so as to translate the log over the rollers whereby the log is ended against the edge of the log ladders, wherein the log ladder further includes second sensing means, cooperating with the lifting and culling means corresponding to the plurality of log cradles, for delayed triggering of translation of the collectively pivotable arms from the lowered upstream position to the raised downstream position, when the logs are held in the plurality of log cradles whereby dwell time of the logs on the log translating means is increased.

An ending apparatus for a log ladder, wherein the log ladder sorts, feed and sequentially indexes logs along a longitudinal array of laterally extending adjacent log cradles, having, in the log cradles, exclusive of a downstream-most log cradle in the longitudinal array, log translating means for laterally translating the logs, when the logs are in the log cradles exclusive of the downstream-most log cradle, so as to abut one end of the logs against an edge of the log ladder, wherein the log translating means has selectively actuable rollers mounted within a lower vertice (i.e. within the lowermost region of the "V" cross sectional shape) of the log cradles, wherein the selectively actuable rollers are mounted in lateral array and the rollers are generally hourglass-shaped so that in longitudinal cross-section the rollers have a longitudinal profile generally matching the longitudinal profile of a longitudinal cross-section of the log cradles, and wherein the log translating means further has first sensing means cooperating with the selectively actuable rollers for sensing the presence of the logs in the log cradles and triggering selective rotation of the selectively actuable rollers whereby said logs are ended against the edge of the log ladders, and wherein the log ladder further has second sensing means, cooperating with lifting and culling means corresponding to the log cradles, for delayed triggering of the lifting and culling means when the logs are held in the log cradles so as to increase dwell time of the logs on the log translating means.

BRIEF DESCRIPTION OF THE DRAWINGS

In the drawings, which represent a specific embodiment of the log ladder incorporated in the present invention, but which should not be construed as limiting the scope of the invention in any way.

DETAILED DESCRIPTION OF THE PREFERRED EMBODIMENT

Figure 1:
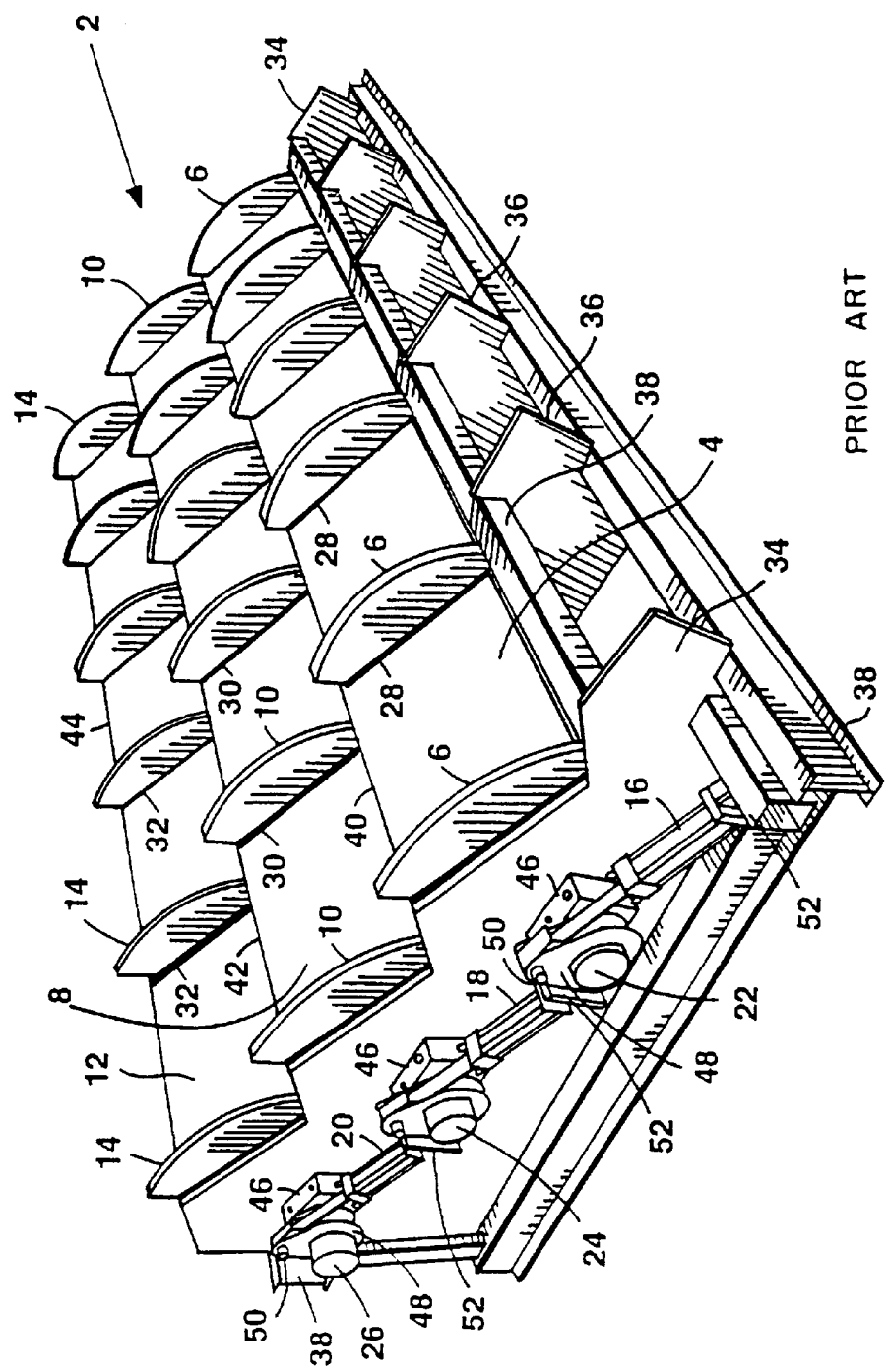
FIG. 1 is a left front perspective view of a prior art three stage log ladder.
Figure 2:
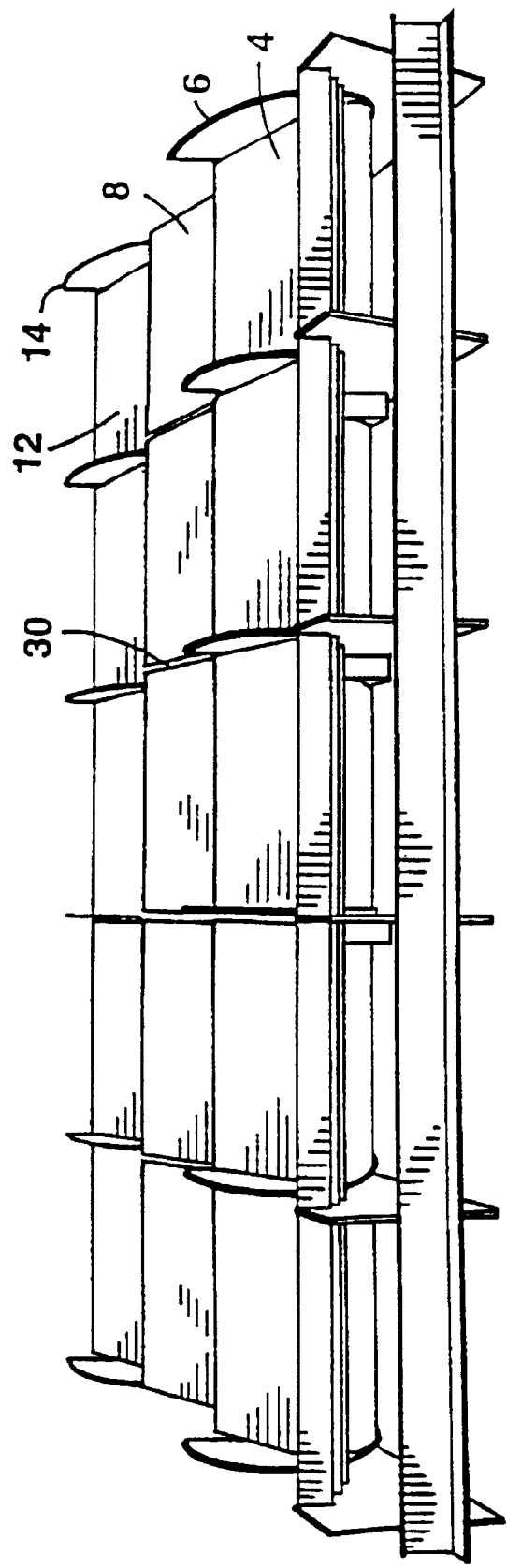
FIG. 2 is a frontal perspective view of a prior art three stage log ladder.

Referring to FIGS. 1 and 2, log ladder 2 has first stage log cradle 4 and associated with first stage log cradle 4 an associated set of first stage lift arms 6, a second stage log cradle 8 and an associated set of second stage lift arms 10, and a third stage log cradle 12 and an associated set of third stage lift arms 14. Lift arms 6, 10 and 14 may be raised or lowered by actuating hydraulic rams 16, 18 and 20 respectively. Actuating hydraulic rams 16, 18 and 20 rotate respective associated axles 22, 24 and 26. Lift arms 6 are mounted on axle 22, lift arms 10 are mounted on axle 24, and lift arms 14 are mounted on axle 26 (better seen in FIG. 2) so that actuating independently actuable hydraulic rams 16, 18 and 20 will raise or lower the associated set of lift arms 6, 10 or 14 by pivoting those lift arms about the associated axle 22, 24 or 26. For example, retracting hydraulic ram 16, which is shown in FIG. 1 in its extended position, rotates axle 22 and retracts lift arms 6 into apertures 28 (better shown in FIG. 3)

to a lowered position below first stage log cradle 4 (see for example lowered lift arms 14 in FIG. 2).

Likewise, lift arms 10 may be raised or lowered in apertures 30 and lift arms 13 may be raised or lowered in apertures 32.

Sidewalls 34 and supporting members 36 support cross members 38. Cross members 38 support first stage skid plate 40, second stage skid plate 42 and third stage skid plate 44. First stage skid plate 40 has apertures 28 cut therein. Second stage skid plate 42 has apertures 30 cut therein. Third stage skid plate 44 has apertures 32 cut therein.

Axles 22, 24 and 26 are journalled through sidewalls 34 and supporting members 36 and turn in bearings or the like (not shown) contained in bearing mounts 46.

Hydraulic rams 16, 18 and 20, which may alternatively be electric drives 16, 18 and 20 known in the art, rotate their associated axles 22, 24 and 26 by rotating collars 48 which are affixed to their respective axles 22, 24 and 26, the force of the stroke of hydraulic rams 16, 18 and 20 acting through pins 50 so as to rotate collars 46 and thereby rotate associated axles 22, 24 or 26.

Hydraulic rams 16, 18 and 20, when actuated, thrust against thrust plates 52. Conventional hydraulic lines which attach to hydraulic rams 16, 18 and 20 are not illustrated.

Referring to FIG. 2, logs 54 are deposited in a generally transversely oriented fashion into first stage log cradle 4. If second stage sensors (not shown) do not detect a log 54 in second stage cradle 8 then hydraulic ram 16 is actuated to raise lift arms 6 and to deposit a log 54 in to second stage log cradle 8. If logs 54 are of small diameter or entangled or otherwise misaligned, lifting faces 56 on lift arms 6 may engage more than one log 54. The log or logs 54 engaged by lifting faces 56 are forced downstream along first stage skid plate 40 as lifting arms 6 are raised.

Figure 3:
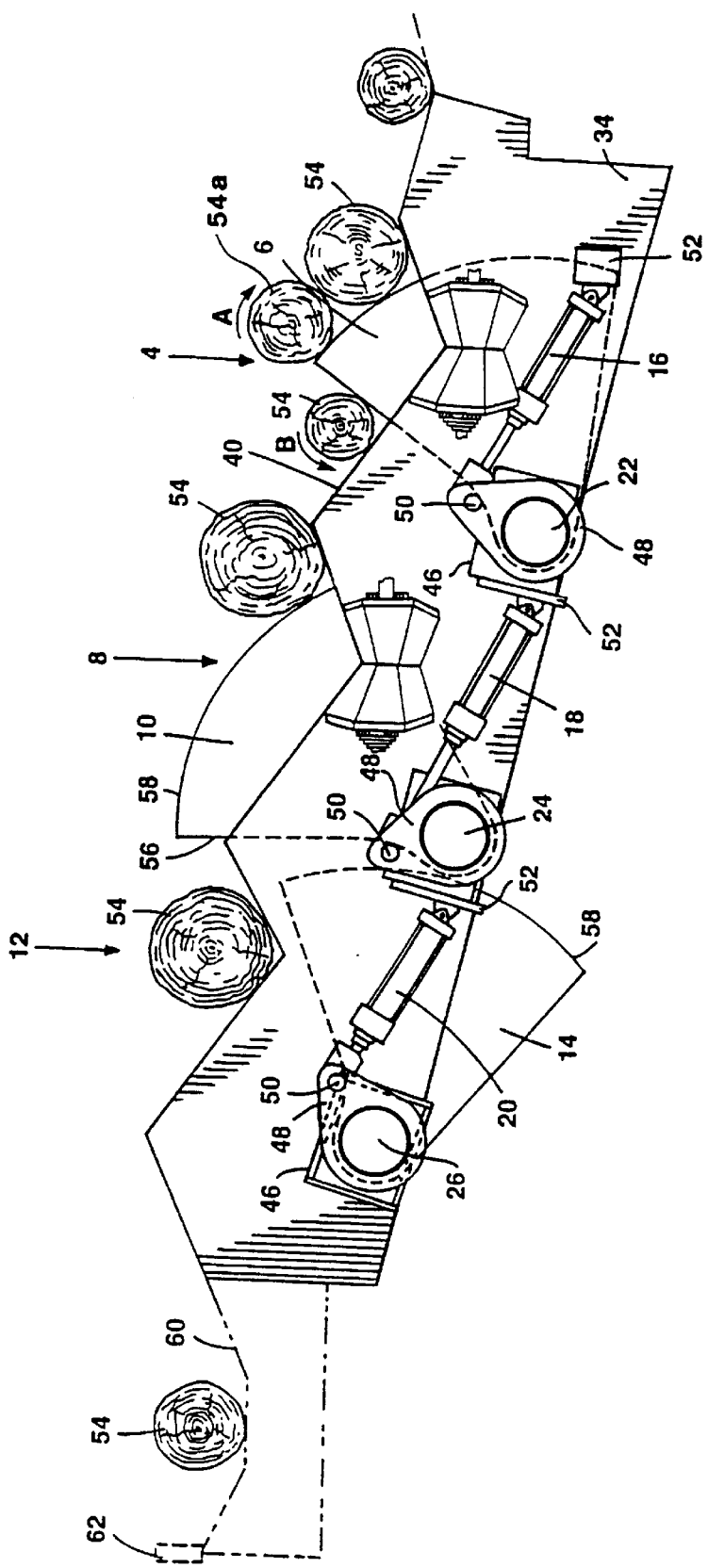
FIG. 3 is a left side elevation view of a three stage log ladder incorporating the ending apparatus of the present invention.

In FIG. 3, the fully raised position of a set of lift arms is indicated by the illustrated position of lift arms 8. The fully lowered position of a set of lift arms is illustrated by the position of lift arms 14. An intermediary position of a set of lift arms, either while the lift arms are being raised or while the lift arms are being lowered, is illustrated in FIG. 3 by the position of lift arms 6.

FIG. 2 depicts first stage lift arms 6 and third stage lift arms 14 in a fully raised position. Second stage lift arms 10 are fully retracted beneath second stage log cradle 8 and thus cannot be seen below apertures 30.

When lift arms 6 reach their fully raised position the log or logs 54 which were engaged by lifting faces 56 are deposited into second stage lop cradle 8. If, as illustrated, the second stage lifting arms 10 have just finished depositing a log 54 into third stage log cradle 12 and have not yet been lowered, then logs 54 deposited into second stage log cradle 8 by first stage lifting arms 6 are queued in second stage log cradle 8 against upstream face 58 of second stage lifting arms 10. Similarly, logs may be queued upstream of first stage lifting arms 6 and third stage lifting arms 14.

Once second stage lifting arms 10 have retracted from the position illustrated in FIG. 3 to a fully lowered position, log 54 queued against upstream face 58 is allowed to roll fully into second stage log cradle 8 whereupon its presence is detected by the second stage sensors so that if the third stage sensors indicate that there is no log 54 in third stage log cradle 12 then hydraulic ram 18 will actuate to again cycle second stage lift arms 8 thereby moving log 54 downstream along the log ladder so as to deposit log 54 into third stage log cradle 12.

Third stage lifting arms 14 deposit logs 54 onto conveyor belt 60. As illustrated in FIG. 3, conveyor belt 60 is transporting logs 54 transversely relative to log ladder 2 so that in FIG. 3 conveyor belt 60 is to be seen as transporting logs 54 directly in to the page.

Conveyor belt sensor 62 detects when logs 54 have been conveyed by conveyor belts 60 transversely relative to log ladder 2 so that the portion of conveyor belt 60 directly adjacent to third stage log cradle 12 is empty. Hydraulic ram 20 is then triggered to raise third stage lifting arms 14 so as to deposit log 54 from third stage log cradle 12 onto conveyor belt 60.

Figure 4:
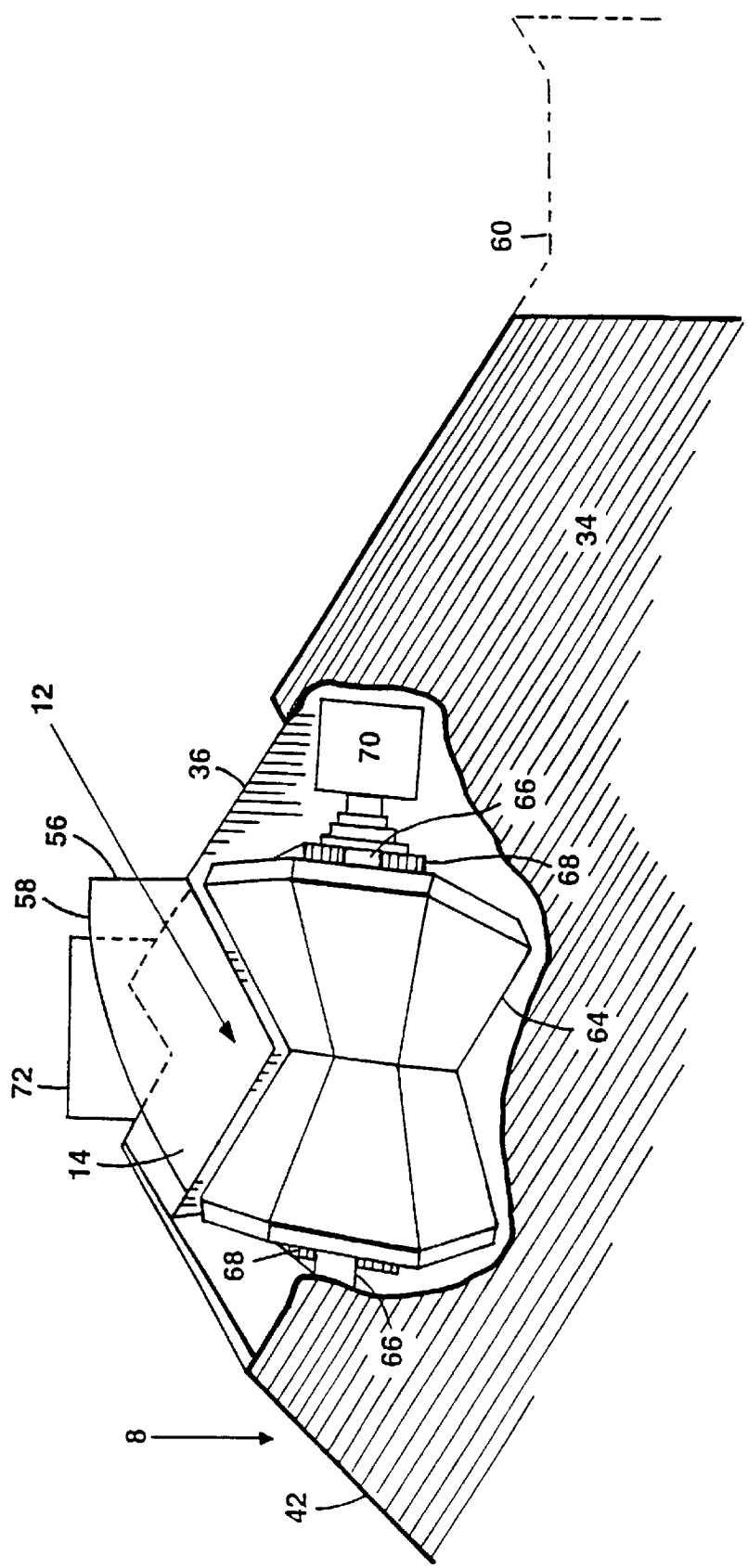
FIG. 4 is a partial cut away view in right side perspective view of ending rolls in one of any stages, except the final stage, of a log ladder incorporating the ending apparatus of the present invention.

FIG. 4 illustrates how motorized hourglass rollers 64 may be incorporated into any stage of the log ladder, except the final downstream stage 12. Only one hourglass roller is depicted but it is understood that there would be a plurality of such rollers in spaced laterally array along the log cradles. For the sake of clarity, FIG. 4 depicts a simplified view of a log ladder incorporating hourglass rollers 64. A first arm 56 in the array of arms 56 is not depicted so that hourglass roller 64 may be clearly seen. It is understood that in the preferred embodiment a first arm 56 would be located between the hourglass roller 64 shown in FIG. 4 and side wall 34 shown partially cut-away. It is also understood that in the preferred embodiment the hourglass rollers 64 have profiles matching the profile, viewed as a longitudinal cross-section, of the log cradles and there is an array of hourglass rollers 64 and arms 56 between the hourglass roller 64 depicted and ending or butting plate 72. See, for example, FIG. 5 illustrates a four stage log ladder incorporating hourglass rollers 64 in lateral arrays within the second and third stage cradles.

Figure 5:
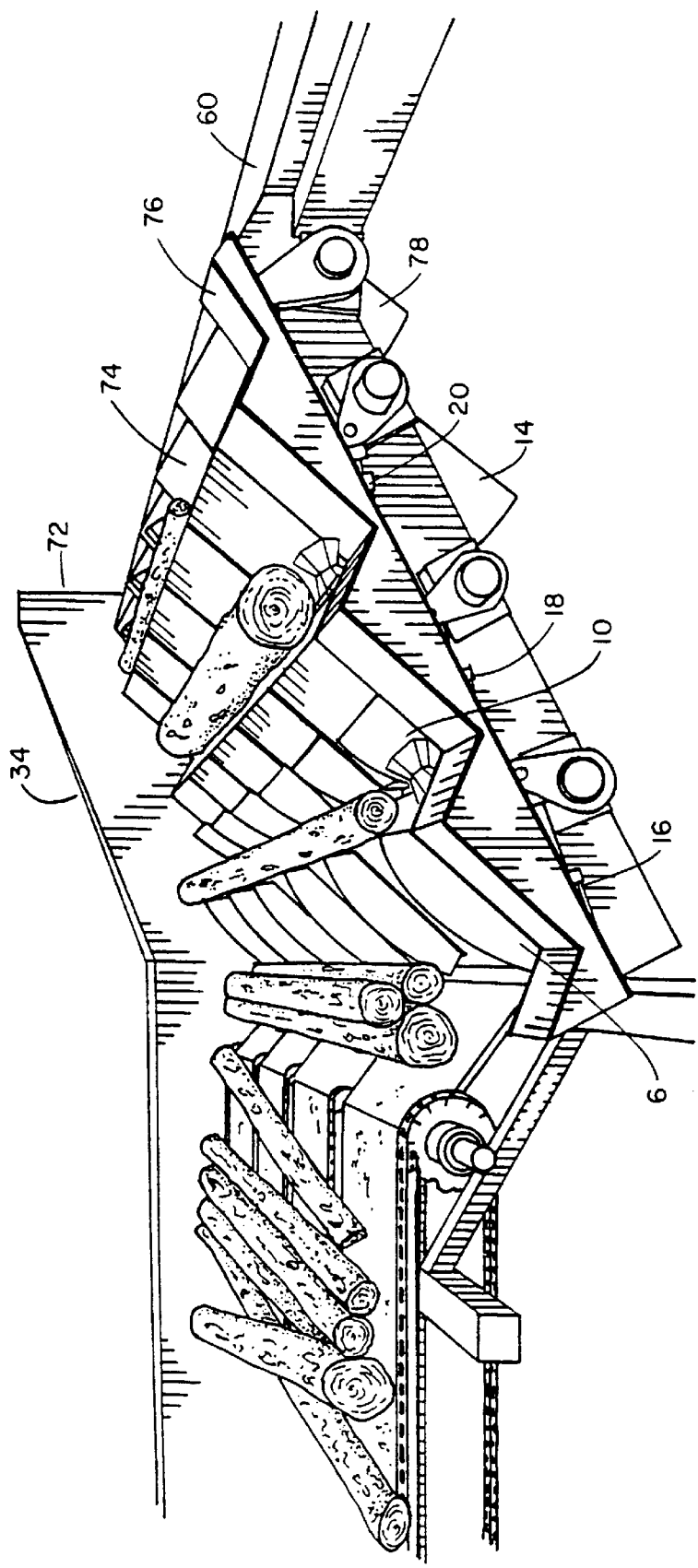
FIG. 5 is a perspective view illustrating a four stage log ladder incorporating the ending apparatus of present invention.

In FIG. 5, butting plate 72 is formed as part of raised sidewall 34 and hydraulic rams 16, 18 and 20 and the fourth stage ram (not shown) are covered by protective casing 76. Fourth stage lift arms 78 are shown lowered beneath fourth stage cradle 74. FIG. 5 illustrates what is anticipated to be a typical installation of the present invention in a log mill environment. Indexing is accomplished by lift arms 10 causing logs 54 to rotate in opposite directions labelled as A and B in FIG. 2. In FIG. 2, Rotation A caused log 54a to pop-up over lift arms 6 and then drop back into an upstream queued position. As depicted in FIG. 4, Hourglass rollers 64 are suspended on axle 66. Axle 66 is at one end journalled in supporting mount 68. Support mount 68 is attached to support member 36. The opposed end of axle 66 is journalled within a gearing mechanism and motor unit (not shown) within housing 70. When a log 54 is dropped into third stage log cradle 12 by second stage lifting arms 10, log 54 rolls to the bottom of third stage log cradle 12 so as to come to rest on hourglass rollers 64. Third stage sensors (not shown) detect the presence of log 54 on hourglass rollers 64 and trigger the motor units contained in housings 70. Hourglass rollers 64 are thus rotated so as to transversely translate log 54 until one end of log 54 abuts butting plate 72 which is mounted to one of sidewalls 34. Butting plate 72 is mounted on the sidewall 34, and may approximately correspond to the position of sensor 62 on conveyor belt 60. Hourglass rollers 64 may be asymmetric so that the contour of the roller surfaces conform to the shape of the notched step, that is, so that the roller surfaces act as skid plates.

Consequently, it is an object of the present invention to provide a log ladder of the type described in my U.S. Pat. No. 5,423,417 which incorporates ending rolls in a plurality of stages, exclusive of the last downstream stage of the log ladder, where the lifting of the lifting arms in the stages having ending rolls is delayed by the associated PLC to provide a dwell time for a log on the ending rolls before the log is lifted by the associated lifting arm to hold the log near the top of the notch for that stage awaiting clearance of the next downstream stage. This optimally results in the log being ended prior to lifting of the log into the last downstream stage so that a log in the last downstream stage may be immediately lifted for deposit onto the log conveyor when the previous log clears the edge of the log ladder.

Figure 6:
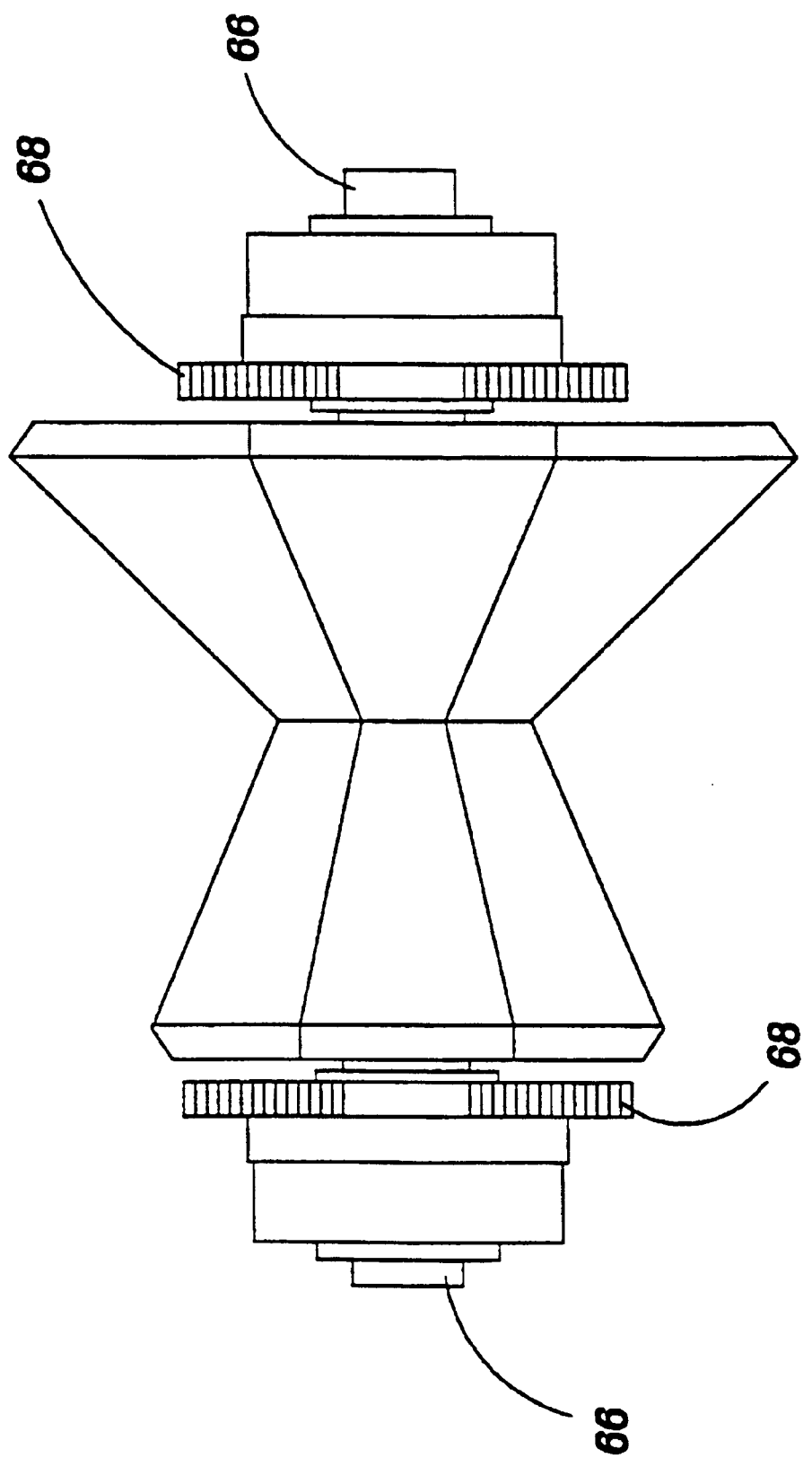
FIG. 6 is, in side elevation view, an ending roll according to an embodiment of the present invention.
Figure 7:
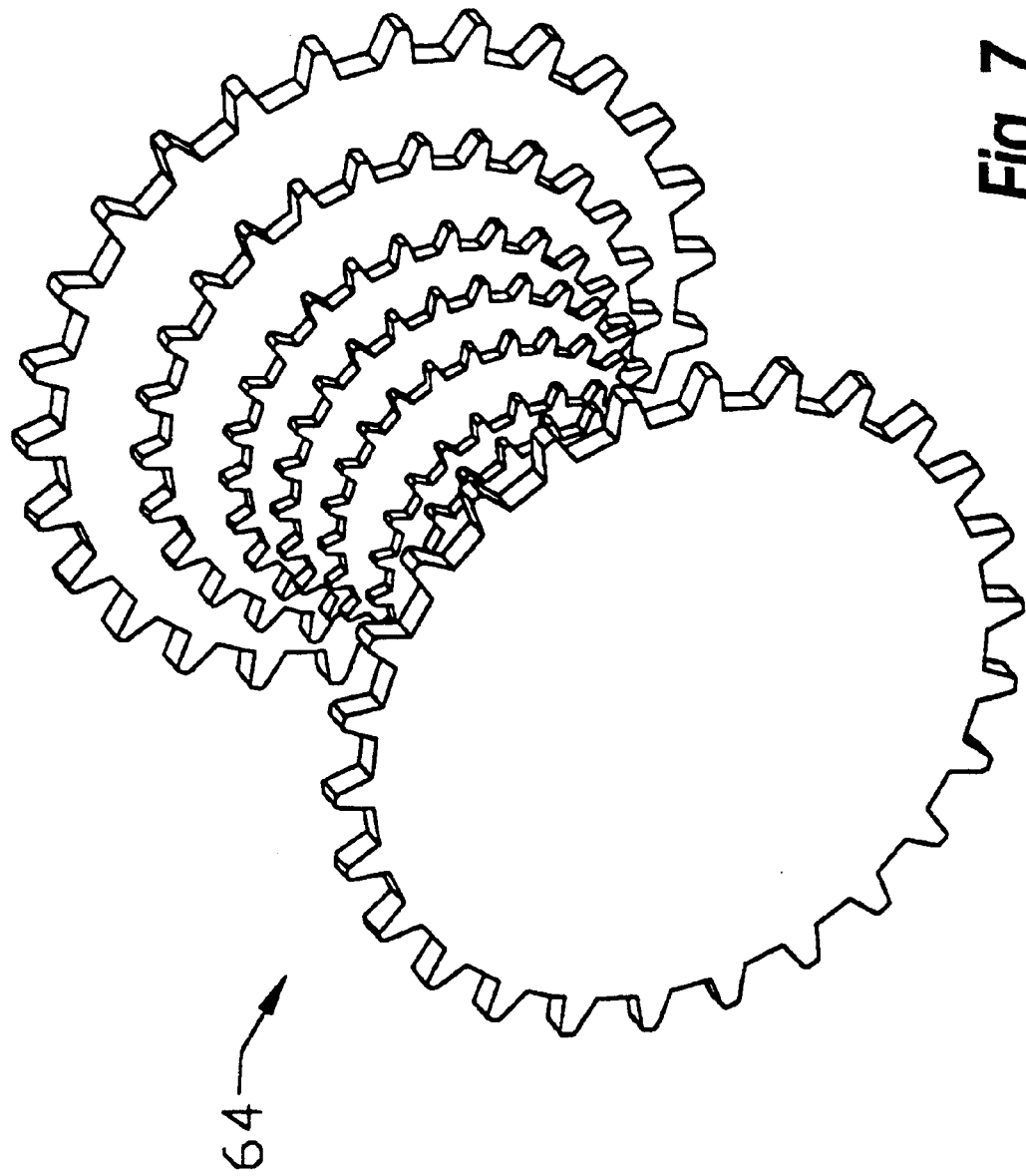
FIG. 7 is, in perspective view, an alternative embodiment of the ending roll of FIG. 6.

As will be apparent to those skilled in the art in the light of the foregoing disclosure, many alterations and modifications are possible in the practice of this invention without departing from the spirit or scope thereof. In particular, it is understood that the log ladder may include a plurality of stages other than the three and four stage log ladders described. Additional stages may be added depending on the transport distance requirements in a specific mill environment. Also, although the preferred log ladder is depicted as progressively elevating logs 54 as they are fed along log ladder 2, there is no physical requirement that logs 54 have to be progressively elevated. By transposing the cross-sectional shape of the notched steps and ending rolls, log ladder 2 may be oriented to progressively lower logs 54 as the logs are fed along the log ladder. Specifically, skid plates 40, 42, and 44 would become shorter and their corresponding upstream skid plates in their respective log cradles would become longer, allowing log cradle 8 to be lower than log cradle 4 and log cradle 12 to be lower than log cradle 8. Corresponding ending rolls 64 would have matching profiles. FIG. 6 illustrates how an ending roll may be tailored in profile. Advantageously this may be accomplished for example by use of varying diameter disk gears or cogs aligned in an adjacent array perpendicular to the axis of rotation of the ending roll, as shown in FIG. 7. Additionally, it is understood that there is no requirement that hourglass rollers 64 be installed in only one or two stages, excepting the final downstream stage, of log ladder 2. Hourglass rollers 64 may be installed in any or all stages of log ladder 2, except for the final downstream stage, to effect high-speed ended transfer of logs.

Further, it is understood that use of hourglass rollers 64 as ending rolls may be modified by use of optical sensing means using laser light or other light sources for illuminating the logs in the log ladder and in particular locating the lateral position of logs in the next to last stages of the log ladder. Optical sensing means such as those sold by Newnes Machine Ltd. of Salmon Arm, British Columbia. Canada or optical sensing means such as those sold by Dynamic Control Systems of Vancouver, British Columbia, Canada, may be utilized to detect the lateral position of logs in the next to last stages of the log ladder and in particular the position of the ends of the logs so that in order to maximize the number of logs on the conveyancing means downstream of the log ladder, instead of using hourglass rollers to abut the logs to one constant reference point immediately prior to the last stage lifting arms lifting the log onto the conveyor belt or whatever conveyancing means is being employed, the lifting arms on the next to last stages of the log ladder may be cycled when as determined by the optical sensing means the last end of the last log just previously placed on the conveyor belt just passes the position of the front of the next log in the last stage of the log ladder, that is the log waiting in the last stage to be placed onto the conveyor belt.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An ending apparatus for a log ladder, where said log ladder sorts, feeds and sequentially indexes in a downstream direction a stack of logs, comprising:

(a) at an upstream end of said log ladder an upstream receiving means, oriented transversely to said log ladder, for receiving and holding in generally transverse orientation a plurality of logs;

(b) along said log ladder, downstream of said upstream end of said log ladder, a spaced and alternating array of (i) lifting and culling means, and (ii) log cradles, each of said log cradles and each of said lifting and culling means in said spaced and alternating array of lifting and culling means and log cradles being oriented transversely to said log ladder, and each of said log cradles being adapted to receive and hold logs in a generally transverse orientation to said log ladder, wherein, at an upstream end of said spaced and alternating array of lifting and culling means and log cradles, a lifting and culling means adjacent to said upstream receiving means for culling one or more logs from said logs in said upstream receiving means and for lifting said logs from said upstream receiving means and depositing said logs into a first log cradle in said spaced and alternating array, said first lifting and culling means cooperating between said upstream receiving means and said first log cradle in said spaced and alternating array, each of the remaining lifting and culling means in said spaced and alternating array cooperating between adjacent log cradles in said spaced and alternating array so as to cull a single log from said first log cradle and thereafter to lift and deposit said single log from an upstream adjacent log cradle to the next adjacent downstream log cradle whereby said single log is passed downstream along, said spaced and alternating array.

wherein each of said lifting and culling means comprise a lateral array of collectively pivotable arms, each of said collectively pivotable arms having a lifting face, said lateral array of collectively pivotable arms thus comprising a lateral array of lifting faces, said lifting faces for engaging and lifting said single log in a downstream direction along said spaced and alternating array, wherein each of said lateral array of arms are collectively pivotable between a lower upstream position below said upstream adjacent log cradle, and a raised downstream position, above and downstream of said lower upstream position, whereby said lateral array of lifting faces is above said next adjacent downstream log cradle, wherein said lateral array of collectively pivotable arms are collectively pivotable about pivots beneath and generally between said log cradles, and wherein each of said lifting and culling means in said spaced and alternating array are independently actuable and wherein said log cradles comprise opposed upstream and downstream skid faces in a generally "V"-shape in longitudinal cross section, said upstream and downstream skid faces comprising fixed rigid protrusion-free sheeting extending along said log cradles, said upstream and downstream skid faces defining therebetween a transverse elongate aperture extending along said log cradles, wherein a plurality of said log cradles, exclusive of the downstream-most log cradle in said spaced and alternating array, comprises log translating means for transversely translating logs, when said logs are in said plurality of log cradles, so as to abut one end of said logs against an edge of said log ladder, wherein said log translating means comprises actuable rollers mounted within said log cradle, wherein said rollers are mounted in lateral array between said upstream and downstream skid faces, and said rollers are generally hourglass-shaped so that in longitudinal cross-section said rollers have a longitudinal profile generally matching the longitudinal profile of a longitudinal cross-section of said upstream and downstream skid faces, wherein said log translating means further comprise first sensing means sensors cooperating with said actuable rollers for sensing the presence of said log in said plurality of log cradles and triggering the rotation of said actuable rollers when said logs are in said plurality of log cradles so as to translate said logs over said rollers whereby said logs are ended against said edge of said log ladders, wherein said log ladder further comprises second sensing means, cooperating with said lifting and culling means corresponding to said plurality of log cradles, for delayed triggering of translation of said collectively pivotable arms from said lowered upstream position to said raised downstream position, when said logs are held in said plurality of log cradles whereby dwell time of said logs on said log translating means is increased.

2. The device of claim 1 wherein said upstream receiving means and said upstream and downstream skid faces have longitudinal slots therein, wherein each arm of said collectively pivotable arms comprises a generally vertically and longitudinally oriented plate and said lifting face comprises an upper downstream edge of said plate, and wherein said plate further comprises a staging face along an upper upstream edge of said plate, wherein said pivots are positioned beneath said downstream skid faces, one of said pivots corresponding to (a) each of said downstream skid faces, and (b) each of said lateral array of collectively pivotable arms, whereby when pivoted from said lowered upstream position to said raised downstream position, said plates are pivoted about said pivots and translated through said longitudinal slots.

3. The device of claim 2 wherein said lifting faces further comprise a generally planar portion of said upper downstream edge of each plate, said generally planar portion extending in a generally radial direction from the pivot corresponding to the lateral array of collectively pivotable arms of which said plate forms a part and wherein said staging face along an upper upstream edge of each plate is curved, said curve generally describing an arc about the pivot corresponding to the lateral array of collectively pivotable arms of which said plate forms a part.

4. An ending apparatus for a log ladder, where said log ladder sorts, feeds and indexes in a downstream direction a stack of logs into a stream of logs, comprising:

a first notched step and a first set of collectively selectively actuable lift arms pivotable about a first axis, and a second set of collectively actuable lift arms, selectively actuable independently of said first set of collectively actuable lift arms, downstream of said first set of lift arms, and pivotable about a second axis, said first set of lift arms selectively actuable between a lowered position and a raised position whereby said first set of lift arms are engagable with a log at a first engagement point, in said stack of logs wherefrom said log may be raised to said raised position, said first axis downstream of said first engagement point relative to the direction of movement of said logs in said stream of logs, said first axis generally below said first notched step, said first notched step adapted to receive and hold said stack of logs, said first set of lift arms in said raised position positioning said log so as to deposit said log into a second notched step below said first set of lift arms in said raised position and downstream of said first notched step, said second set of lift arms selectively actuable between a lowered position and a raised position whereby said second set of lift arms are engagable with said log in said second notched step at a second engagement point wherefrom said log may be raised from said second notched step, said second axis downstream of said second engagement point and generally below said second notched step said second set of lift arms in said raised position positioning said log so as to deposit said log into a third notched step below said second set of lift arms in said raised position and downstream of said second notched step, a third set of lift arms, pivotable about a third axis selectively actuable between a lowered position and a raised position whereby said third set of lift arms are engageable with said log in said third notched step at a third engagement point wherefrom said log may be raised from said third notched step, said third axis downstream of said third engagement point and generally below said third notched step, said third set of lift arms in said raised position positioning said log so as to deposit said log into a fourth notched step below said third set of lift arms in said raised position and downstream of said third notched step, a fourth set of lift arms, pivotable about a fourth axis, selectively actuable between a lowered position and a raised position whereby said fourth set of lift arms are engageable with said log in said fourth notched step at a fourth engagement point wherefrom said log may be raised from said fourth notched step, said fourth axis downstream of said fourth engagement point and generally below said fourth notched step, said fourth set of lift arms in said raised position positioning said log so as to deposit said log into an adjacent downstream log receiving means, said first, second, third and fourth notched steps further comprising opposed upstream and downstream skid faces in a generally "V"-shape in longitudinal cross section, said upstream and downstream skid faces comprising fixed rigid protrusion-free sheeting extending along said first, second, third and fourth notched steps transversely across said log ladder, said upstream and downstream skid faces defining therebetween a transverse elongate aperture in each of said first, second, third and fourth notched steps, the first, second and third notched steps including log translating means for transversely translating logs, when logs are in the first, second and third notched steps, so as to abut one end of the logs against an edge of the log ladder, wherein the rollers are mounted in lateral array between the upstream and downstream skid faces, and the rollers are generally hourglass-shaped so that in longitudinal cross-section the rollers have a longitudinal profile generally matching the longitudinal profile of a longitudinal cross-section of the upstream and downstream skid faces, wherein the log translating means further includes first sensing means sensors cooperating with the actuable rollers for sensing the presence of the log in the plurality of log cradles and triggering the rotation of the actuable rollers when the log is in the plurality of log cradles so as to translate the log over the rollers whereby the log is ended against the edge of the log ladders, wherein the log ladder further includes second sensing means, cooperating with the lifting and culling means corresponding to the plurality of log cradles, for delayed triggering of translation of the collectively pivotable arms from the lowered upstream position to the raised downstream position, when the logs are held in the plurality of log cradles whereby dwell time of the logs on the log translating means is increased.

5. A log ladder for high speed sorting feeding and sequentially indexing logs along a longitudinal array of laterally extending adjacent log cradles, comprising, in said log cradles, exclusive of a downstream—most log cradle in said longitudinal array log translating means for laterally translating said logs, when said logs are in said log cradles exclusive of said downstream—most log cradle, so as to abut one end of said logs against an edge of said log ladder, wherein said log translating means comprise selectively actuable rollers mounted within a lower vertice of said log cradles, wherein said selectively actuable rollers are mounted in lateral array and said rollers are generally hourglass-shaped so that in longitudinal cross-section said rollers have a longitudinal profile generally matching the longitudinal profile of a longitudinal cross-section of said log cradles, and wherein said log translating means further comprise first sensing means cooperating with said selectively actuable rollers for sensing the presence of said logs in said log cradles and triggering selective rotation of said selectively actuable rollers whereby said logs are ended against said edge of said log ladders, and wherein said log ladder further comprises second sensing means, cooperating with lifting and culling means corresponding to said log cradles, for delayed triggering of said lifting and culling means when said logs are held in said log cradles so as to increase dwell time of said logs on said log translating means.

* * * * *